(12) United States Patent
Stuenkel et al.

(10) Patent No.: US 7,521,686 B2
(45) Date of Patent: Apr. 21, 2009

(54) INTRINSICALLY DIRECTIONAL FAST NEUTRON DETECTOR

(75) Inventors: David Otto Stuenkel, Villa Hills, KY (US); Raymond Paul Wood, Cincinnati, OH (US)

(73) Assignee: Trinity Engineering Associates, Inc., Cincinnati, OH (US)

( * ) Notice: Subject to any disclaimer, the term of this patent is extended or adjusted under 35 U.S.C. 154(b) by 59 days.

(21) Appl. No.: 11/840,415

(22) Filed: Aug. 17, 2007

(65) Prior Publication Data

US 2009/0045348 A1    Feb. 19, 2009

(51) Int. Cl.
*G01T 3/06* (2006.01)
(52) U.S. Cl. .................................. 250/390.11
(58) Field of Classification Search ................................
250/390.01–390.12
See application file for complete search history.

(56) References Cited

U.S. PATENT DOCUMENTS

| | | | |
|---|---|---|---|
| 3,581,091 A | 5/1971 | Meijer |
| 4,152,600 A | 5/1979 | Berry |
| 4,419,578 A | 12/1983 | Kress |
| 4,940,603 A | 7/1990 | Soltani |
| 5,029,262 A | 7/1991 | Schulte |
| 5,036,202 A | 7/1991 | Schulte |
| 5,345,084 A | 9/1994 | Byrd |
| 5,659,177 A | 8/1997 | Schulte et al. |
| 5,665,970 A | 9/1997 | Kronenberg et al. |
| 5,880,469 A | 3/1999 | Miller |
| 6,100,530 A | 8/2000 | Kronenberg et al. |
| 6,349,124 B1 | 2/2002 | Kronenberg et al. |
| 6,479,826 B1 | 11/2002 | Klann et al. |
| 6,495,837 B2 | 12/2002 | Odom et al. |
| 6,566,657 B2 | 5/2003 | Odom et al. |
| 6,639,210 B2 | 10/2003 | Odom et al. |
| 6,928,130 B1 | 8/2005 | Kronenberg et al. |
| 6,954,512 B1 | 10/2005 | Kronenberg et al. |
| 6,989,541 B2 | 1/2006 | Penn |
| 7,105,832 B2 | 9/2006 | Dai et al. |

(Continued)

OTHER PUBLICATIONS

Iguchi et al., "Development of Directional Neutron Detector for Compact Fast Neutron Camera,", 2001, IEEE, Nuclear Science Symposium Conference Record, vol. 1, pp. 6/207-6/210.*

(Continued)

*Primary Examiner*—David P Porta
*Assistant Examiner*—Kiho Kim
(74) *Attorney, Agent, or Firm*—Hasse & Nesbitt LLC; Ronald J. Richter

(57) ABSTRACT

A directional fast neutron detector having superposed layers of a hydrogenous non-scintillating material for generating recoil protons, a non-hydrogenous scintillating material for generating scintillations, and a non-hydrogenous non-scintillating barrier material, in which the layers are placed in a specific order at regular intervals and the composition and thickness of the layers can be varied in order to alter the efficiency and sensitivity of the system. The detector exhibits both intrinsic and geometric directionality. The intrinsic directionality will depend primarily on the materials selected and the thicknesses of the individual layers, while the geometric directionality will depend primarily on the size and shape of detector. The detector of the invention provides a compact, relatively easy to use, directional neutron detector for use in locating and monitoring special nuclear materials and other sources of fast neutrons.

20 Claims, 7 Drawing Sheets

U.S. PATENT DOCUMENTS

| | | |
|---|---|---|
| 7,141,799 B1 | 11/2006 | Neal et al. |
| 7,151,815 B2 | 12/2006 | Ruddy et al. |
| 2002/0141529 A1 | 10/2002 | Olsher et al. |
| 2005/0127300 A1 | 6/2005 | Bordynuik |

OTHER PUBLICATIONS

Peel, J. et al., "Development of a directional scintillating fiber detector for 14 MeV neutrons," Nuclear Instruments and Methods in Physics Research, vol. A556, 287-290, 2006.

Miller et al., "SONTRAC: An imaging spectrometer for MeV neutrons" Nuclear Instruments and Methods in Physics Research, vol. A505, 36-40, 2003.

McGregor, D.S. et al., "Thin-film-coated bulk GaAs detectors for thermal and fast neutron measurements," Nuclear Instruments and Methods in Physics Research, vol. A466, 126-141, 2001.

Klann, R.T. and McGregor, D.S., "Development of Coated Gallium Arsenide Neurtron Detectors," Proceedings of ICONE 8, 8th International Conference on Nuclear Engineering, Apr. 2-6, 2000, Baltimore, MD, USA.

* cited by examiner

INTRINSICALLY DIRECTIONAL FAST NEUTRON DETECTOR

FIELD OF THE INVENTION

The present invention relates in general to the field of neutron detection, and more particularly to a fast neutron detector that intrinsically provides information about the direction of the incident neutron radiation.

BACKGROUND OF THE INVENTION

The detection of fast neutrons is important for a number of applications, including nuclear safeguards, homeland security, and health physics. Charged radiation particles, such as alpha particles, typically create ion electron pairs as they slow down, providing a direct means for their detection. Being electrically neutral, neutrons do not interact with electrons like heavy charged particles. Instead, neutrons are indirectly detected after interacting with nuclei within a detector to produce a charged particle. For low energy neutrons (typically called thermal neutrons), there are a number of nuclear reactions that can produce energetic charged particles. Because the energy released (the Q value) during the reaction is much greater than the kinetic energy of the thermal neutron, the energy and direction of the resulting charged particles provide no information about the energy or direction of the incident neutron. For high energy neutrons (typically called fast neutrons) elastically scattering off nuclei, typically little or no energy is released, such that the energy and direction of the electrically charged recoil nuclei can be used to determine the direction and/or energy of the incident fast neutron.

Detectors based on the detection of recoil protons have been used for many years to detect and in some instances measure the energy and/or direction of fast neutrons. Fast neutrons elastically scatter off protons in the hydrogen atoms of the detector, resulting in recoil protons. (Approximately 99.99% of hydrogen nuclei consist of a single proton.) The energy and direction of the recoil protons depend on the energy and direction of the incident neutron and the scattering angle. Indeed, the collisions between neutrons and protons can be compared to billiard ball collisions. Because neutrons and protons have nearly equal masses, the neutron scattering angle ranges between 0° and 90°, and the energy of the recoil proton ranges between zero and the energy of the incident neutron. The most energetic recoil protons are those scattered in the direction of the incident neutron, and the least energetic recoil protons are those scattered in a direction normal to the direction of the incident neutron.

Directional neutron detectors are typically designed either to determine the direction of incoming radiation, or to discriminate between sources of radiation coming from different directions. Thus, directional fast neutron detectors based on the detection of recoil protons can typically be classified into two broad categories: (1) those detectors that can determine the energy and direction of individual fast neutrons; and (2) those detectors that can preferentially discriminate fast neutrons incident from one direction from fast neutrons incident from other directions. The prior art includes various patents disclosing efforts to improve the science of directional neutron and/or radiation detectors. Patents thought to be the most relevant to the present invention are summarized as follows:

U.S. Pat. Nos. 5,029,262 and 5,036,202 to Schulte disclose bi-directional neutron detectors comprised of spaced hydrogenous layers interspersed with stacks of silicon detector layers. The signals produced by the silicon detectors are proportional to the energy loss in the detector layers, and these will vary as the proton loses more and more energy during its travel through the silicon detector layers. A pattern of energy loss is established through the stack of silicon layers which, in turn, is indicative as to whether the neutron producing the recoil proton has entered the detector from a front direction or a rear direction. This determination may be made without the necessity of measuring the track and total energy of a recoil proton as it passes through the detector.

U.S. Pat. No. 5,345,084 to Byrd discloses a segmented neutron detector consisting of a plurality of omni-directional radiation detectors arranged in a close packed symmetrical pattern. The output radiation counts from these detectors are arithmetically combined to provide the direction of a source of incident radiation. Indeed, output counts from paired detectors are subtracted to yield a vector direction toward the radiation source. The counts from all of the detectors can be combined to yield an output signal functionally related to the radiation source strength.

U.S. Pat. No. 5,880,469 to Miller discloses an apparatus and method for discriminating against neutrons coming from directions other than a preferred direction and also discriminating against gamma rays. Neutrons are detected through proton recoils in an array of optical scintillating fibers, and the optical fibers alternate between those which emit photons only in the lower portion of the electromagnetic spectrum and those which emit photons only in the higher portion of the electromagnetic spectrum. One end of the scintillating fibers is attached to one end of a light pipe. The other end of the light pipe is attached to two photomultiplier tubes (PMTs), parallel to each other. A signal processing unit registers a detected neutron if a signal is received from only one PMT and will register a background event if signals are received from both PMTs.

U.S. Pat. Nos. 6,495,837, 6,566,657 and 6,639,210 to Odom et al. disclose fast neutron detectors fabricated with alternating layers of hydrogenous, optically transparent, non scintillating material and scintillating material. The scintillating material is preferably zinc sulfide (ZnS), and the hydrogenous material is preferably plastic. Fast neutrons interact with the hydrogenous material generating recoil protons. The recoil protons enter the scintillating material resulting in scintillations. The detector is optically coupled to a PMT which generates electrical pulses proportional in amplitude to the intensity of the scintillations. Alternating layers of materials are dimensioned to optimize total efficiency of the detector.

U.S. Pat. No. 6,479,826 to Klann et al. discloses a device for detecting neutrons including a semi-insulated bulk semiconductor substrate having opposed polished surfaces. A blocking Schottky contact comprised of a series of metals such as Ti, Pt, Au, Ge, Pd, and Ni is formed on a first polished surface of the semiconductor substrate, while a low resistivity ("ohmic") contact comprised of metals such as Au, Ge, and Ni is formed on a second, opposed polished surface of the substrate. Disposed on the Schottky contact is a neutron reactive film, or coating, for detecting neutrons. By varying the coating thickness and electrical settings, neutrons at specific energies can be detected.

U.S. Pat. No. 7,141,799 to Neal et al. discloses a detector system that combines a $^6$Li-loaded glass fiber scintillation thermal neutron detector with a fast scintillation detector in a single layered structure. Detection of thermal and fast neutrons and ionizing electromagnetic radiation is achieved in the unified detector structure. Fast neutrons, x-rays and gamma rays are detected in the fast scintillator. Thermal neutrons, x-rays and gamma rays are detected in the glass fiber scintillator.

While these prior art neutron detectors are useful for their intended purposes, a continuing need exists for an improved fast neutron detection system which is small in size, simple to operate, and more rugged than currently existing directional neutron detection systems, and also in which the efficiency and the sensitivity of neutron detection can be specified for a given application.

SUMMARY OF THE INVENTION

In light of the foregoing, the present invention provides a directional fast neutron detector that detects neutrons depending on their incoming direction, generally by employing a plurality of layers of differing materials, the layers having different elemental compositions and scintillating properties, but with similar optical properties. More specifically, the neutron detector of the invention includes layers of: (1) a hydrogenous non-scintillating material for generating recoil protons, (2) a non-hydrogenous scintillating material for generating scintillation light when the recoil protons lose energy therein, and (3) a non-hydrogenous non-scintillating barrier material that stops some recoil protons before reaching the non-hydrogenous scintillating material.

Typically the thicknesses of the layers are chosen such that the detector will achieve a desired directional response. Neutrons are only detected if the recoil protons they create deposit part of their energy in a layer of scintillating material, but are not detected if the recoil proton loses all its energy in the hydrogenous non-scintillating layer and/or barrier layer. The composition and thickness of the layered materials can be varied in order to reduce the probability that neutrons entering at large angles will be detected or to prevent their detection altogether. Selecting layered materials that have similar indices of refraction and are transparent to the scintillation light produced facilitates light collection and minimizes the requirements for signal processing and data analysis.

A first aspect of the invention provides a directional fast neutron detector, comprising (a) a plurality of layers of material arranged in an order, each of the plurality of layers having a predetermined thickness and a composition selected from the group consisting of: (i) a hydrogenous non-scintillating converter material operable to produce a recoil proton when a fast neutron is incident therein; (ii) a non-hydrogenous scintillating material operable to generate a scintillation light when the recoil proton loses energy therein; and (iii) a non-hydrogenous non-scintillating barrier material operable to act as a barrier to passage of the recoil proton therethrough; and (b) at least one light collection device located along the periphery of the layers for producing a signal when the scintillation light generated by the non-hydrogenous scintillating material is incident thereon, wherein the composition, order, and thickness of each of the plurality of layers allows the general direction of incoming incident fast neutrons to be established.

A second aspect of the invention provides a directional fast neutron detector, comprising (a) a plurality of layers of a hydrogenous non-scintillating converter material operable to produce a recoil proton when a fast neutron is incident therein; (b) a plurality of layers of a non-hydrogenous scintillating material operable to generate scintillation light when the recoil proton loses energy therein; and (c) a plurality of layers of a non-hydrogenous non-scintillating barrier material operable to act as a barrier to passage of the recoil proton therethrough, wherein the plurality of layers of materials are arranged in an order, each of the plurality of layers having a predetermined thickness, and wherein the composition, order, and thickness of each of the plurality of layers allows the general direction of incoming incident fast neutrons to be established.

A third aspect of the invention provides a method for detecting fast neutrons, comprising (a) providing a fast neutron detector, wherein the detector comprises a plurality of layers of material arranged in an order, each of the plurality of layers having a predetermined thickness and a composition selected from the group consisting of: (i) a hydrogenous non-scintillating converter material operable to produce a recoil proton when a fast neutron is incident therein; (ii) a non-hydrogenous scintillating material operable to generate a scintillation light when the recoil proton loses energy therein; and (iii) a non-hydrogenous non-scintillating barrier material operable to act as a barrier to passage of the recoil proton therethrough; (b) providing at least one light collection device for producing a signal when the scintillation light generated by the non-hydrogenous scintillating material is incident thereon; and (c) determining the general direction of the incoming incident fast neutrons according to the composition, order, and thickness of each of the plurality of layers.

The nature and advantages of the present invention will be more fully appreciated from the following drawings, detailed description and claims.

BRIEF DESCRIPTION OF THE DRAWINGS

The accompanying drawings illustrate embodiments of the invention and, together with a general description of the invention given above, and the detailed description given below, serve to explain the principles of the invention.

DETAILED DESCRIPTION OF THE INVENTION

Figure 1:
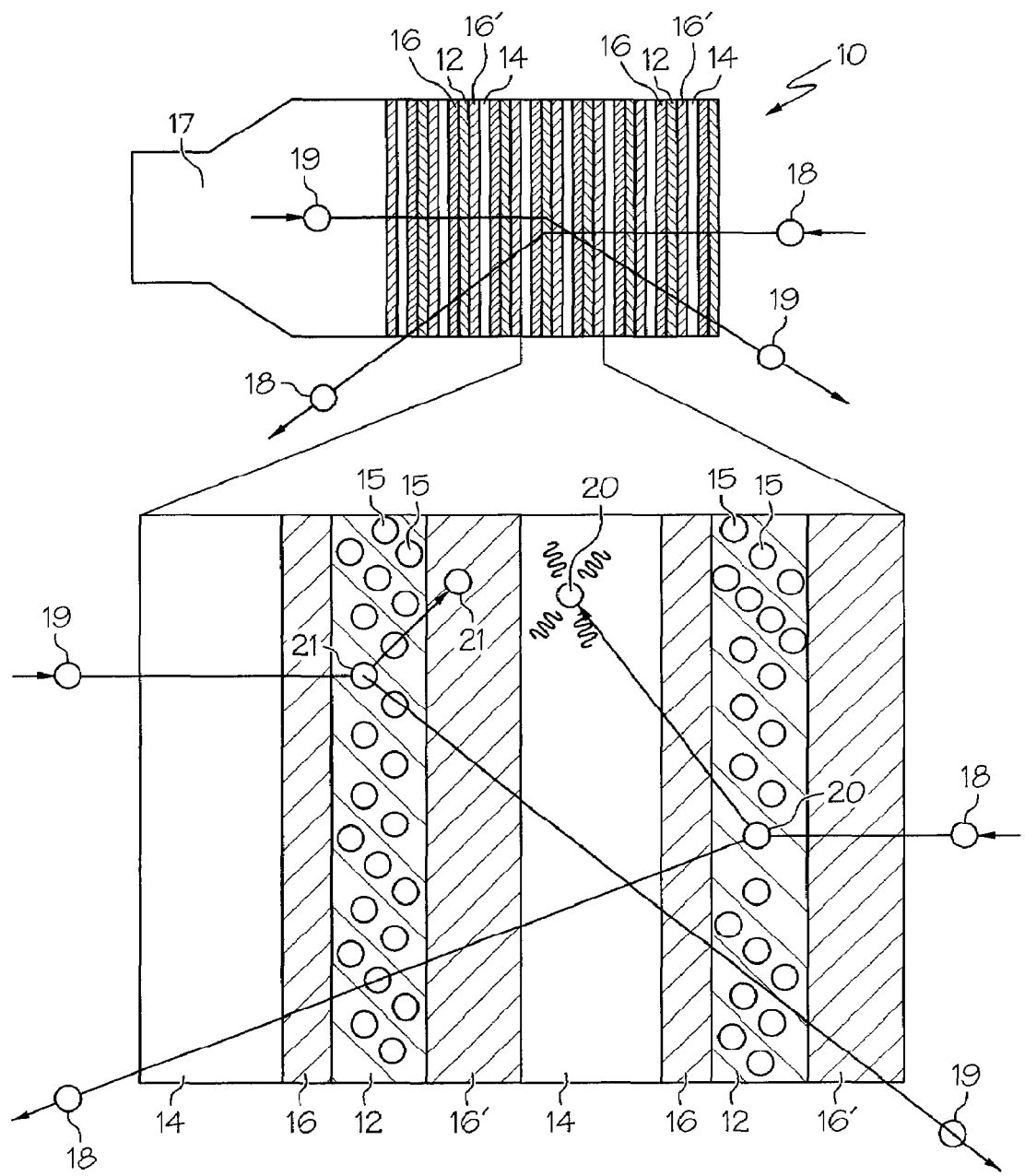
FIG. 1 is a schematic illustration of the neutron detector of the invention, showing the various layers internal to the detector.

The term "absolute efficiency" is conventionally defined as the probability that a neutron or other particle of radiation will give rise to an output pulse or signal by a detector. Typically the absolute efficiency of a detector is a function of both the detector's intrinsic efficiency and its geometric efficiency. As it relates to the fast neutron detector of the present invention, absolute efficiency is the ratio of the count rate of the detector to the intensity of a monodirectional neutron radiation field.

The term "barn" is a unit of area. One (1) barn is defined as $10^{-24}$ cm$^2$ or approximately equal to the cross-sectional area of one uranium nucleus. While the barn is not an SI unit, it is accepted for use with the SI. Originally used in nuclear physics for expressing the cross-sectional area of nuclei and nuclear reactions, today it is used in all fields of high energy physics to express the cross-sections of any scattering process.

The term "count rate" is rate at which particles (i.e. neutrons) interact within the detector to produce a measurable pulse signal. As it relates to the fast neutron detector of the present invention, it is the rate at which light scintillations are detected in the photomultiplier tube, photodiode, or other light collection device, indicating that a neutron has elastically scattered producing a recoil proton that deposits part of its energy in the scintillating material.

The term "directionality" as it relates to a fast neutron detector of the present invention is defined as the efficiency (intrinsic, geometric, or absolute) as a function of the relative angle between the main axis of the detector and the direction of a monodirectional neutron radiation field. For example, the absolute directionality is the absolute efficiency of the detector as a function of the angle between the main axis of the detector and the direction of a monodirectional neutron radiation field.

The term "geometric efficiency" is conventionally defined as the probability that a particle of interest (i.e. photon or neutron) will be incident on a detector. Geometric efficiency typically depends on the shape, size and orientation of the detector in relation to the incoming angle of the neutron particles. As it relates to the fast neutron detector of the present invention, geometric efficiency is the ratio of the interaction rate of the detector to the intensity of a monodirectional neutron radiation field.

The term "intrinsic efficiency" is conventionally defined as the probability that a particle of interest (i.e. photon or neutron) incident on the detector will be detected. Intrinsic efficiency depends primarily on the material composition of the detector, the energy of the incident radiation, and the thickness of the detector material layer in the direction of the incident radiation. As it relates to the fast neutron detector of the present invention, intrinsic efficiency is the probability that a particle of interest (i.e. photon or neutron) that interacts in the detector will be detected by the deposition of energy in the layer of scintillating material from a recoil proton.

The term "range" as it relates to energetic charged particles, including recoil protons, is the average distance the charged particle travels before it loses all of its energy and stops. Regarding recoil protons generated in the fast neutron detector of the present invention, the range typically depends on the energy of the recoil proton and the materials used to slow it down.

Referring now to FIG. 1, one embodiment of a directional fast neutron detector 10 of the invention is illustrated. The detector 10 generally has a plurality of internal layers of differing composition. More specifically the layers are a hydrogenous non-scintillating converter material 12 (for generating recoil protons), a non-hydrogenous scintillating material 14 (for generating a scintillation light when the recoil protons loses energy therein), and a non-hydrogenous, non-scintillating barrier material 16 and 16' (for stopping some recoil protons before they reach the scintillating material 14). A light collection device, illustrated here in the form of a photomultiplier tube (PMT) 17 detects light pulses, or scintillation lights, generated by the scintillating material 14. Fast neutrons 18, 19 enter the detector 10 and interact with the one of the layers, 12, 14, 16, 16'.

As shown in the expanded portion of the detector 10 of FIG. 1, the fast neutrons 18, 19 elastically scatter off hydrogen nuclei 15 present within the converter material 12. Collisions between the neutrons 18, 19 and the hydrogen nuclei 15 generate recoil protons 20, 21, respectively. Looking at FIG. 1, for the neutron 18 incident from the right side of the detector, recoil proton 20 exits the left side of the converter layer 12, passes through a thin barrier layer 16 and is stopped in one of the scintillating material layers 14, depositing part of its energy in each layer it passes through. The deposition of energy in any of the scintillating material layers 14 typically results in the generation of scintillation light and a signal pulse, which will be detected by the PMT 17. Regarding the fast neutron 19 incident from the left side of the detector, the recoil proton 21 generated is stopped in a thick barrier material layer 16', depositing all its energy therein (as well as some in the converter layer 12). Since the recoil proton 21 does not have enough energy to pass through to one of the scintillating material layers 14, it generates no scintillation light and no signal pulse.

The thicknesses of the layered materials 12, 14, 16, 16' intrinsically determine the directionality of detector, and can be varied in order to alter the intrinsic efficiency of the detector 10 as a function of the direction of incident neutrons. That is, generally the barrier layers 16 are relatively thinner than the thick barrier layers 16' in order to provide directionality to the neutron detector 10. Since only recoil protons that lose at least some of their energy in the scintillating material layer 14 can result in a detectable signal, the thicknesses of the barrier layers 16, 16' on either side of the converter layers 12 can be chosen to discriminate against all neutrons of a given energy whose angle of incidence exceeds a given value. Indeed, in one embodiment the thin barrier layer 16 can be very thin, or even omitted altogether (width=zero).

Typically the thicknesses of the barrier layers 16, 16' will be different depending on which side of the converter layer 12 they are located so that only neutrons traveling in one general direction (i.e. from right to left) will be detected and the general direction of the incoming neutrons can be established. That is, in FIG. 1 the barrier layer 16 which is located immediately to the left of a converter layer 12 is relatively thin, as compared to the thicker barrier layer 16' located immediately to the right of that converter layer 12. Typically the internal layers are arranged in a specific order, which repeats as follows: thin barrier layer 16/converter layer 12/thick barrier layer 16'/scintillating layer 14.

For example, in FIG. 1, the recoil proton 21 generated by neutron 19 coming from left side of the detector 10 stops in the non-scintillating barrier material layer 16' before it reaches the scintillating material layer 14, while the recoil proton 20 generated by neutron 18, coming from the right side of the detector 10, is able to pass through the thin barrier layer 16 and reach the scintillating layer 14, which will then generate a scintillation light that will be detected by the PMT 17. That is, the barrier layer 16 that recoil proton 20 passes through as it exits the left side of the converter layer 12 is relatively thin, so that the recoil proton can reach the scintillating layer 14 and generate a signal pulse, while the barrier layer 16' that recoil proton 21 passes through as it exits the right side of the converter layer 12 is thick, so that it is stopped before it can reach the scintillating layer 14 to the right.

Thus, if the thicknesses of the barrier material layers 16, 16' are greater than the range of highest energy recoil protons that can be produced, then all of the generated recoil protons will be stopped in the barrier material layers 16, 16'. If the thicknesses of the barrier material layers 16, 16' are less than the range of highest energy recoil protons, then some of the recoil protons will be stopped in the barrier layers and some will reach the scintillating material layer 14. The probability that recoil protons will have sufficient energy and range to reach the scintillating layer 14 will depend on the angle of the incident neutrons, and will decrease as the angle of incidence increases relative to the normal of the surface of the layers 12, 14, 16, and 16' thereby giving the detector intrinsic directionality.

Neutrons can interact with any nuclei in the detector, but typically only fast neutrons that elastically scatter off hydrogen nuclei inside the hydrogenous non-scintillating converter material layer 12, producing a recoil proton, are likely to produce enough scintillation light in the non-hydrogenous scintillating material layer 14 to allow detection (because a hydrogen nucleus consists of only a single proton, the recoil proton referred to throughout this document is typically a recoil hydrogen nucleus). Neutrons can elastically scatter off nuclei other than hydrogen, but these larger recoil nuclei have shorter ranges than does a recoil proton of the same energy, and are much less likely to travel to and deposit any energy in the scintillation material 14. Since only recoil protons are likely to result in sufficient scintillation to allow detection, materials should be selected to maximize the probability that the incoming fast neutrons interact with hydrogen nuclei in the converter material layer 12 to produce recoil protons, and minimize the probability that the incoming neutrons interact with other types of nuclei in any of the three layers.

The probability that the neutrons will interact with a nucleus within a given material layer depends on three values. The first value is the atom density, which is a measure of how densely packed the nuclei are in the material layer. The second value is the microscopic cross-section, which is a measure of the individual probability that the incoming fast neutrons will interact with a nucleus while traversing the material layer. The third value is the thickness of the material layer. The probability that a neutron will react with a nucleus in a layer increases as any of these three values (atom density, microscopic cross-section, and thickness) increase. Only one of these values, the microscopic cross-section, depends on the energy of the incident neutron. For neutrons with energy of one or more megaelectronvolts (MeV), which is the energy of interest for the detector of the invention, the difference in microscopic cross-section between materials is not significant. Thus, the fraction of neutrons interacting in the detector that elastically scatters off hydrogen nuclei while passing through the detector will most strongly depend on the fraction of the nuclei in the detector that are hydrogen nuclei. This means that materials having a high density of hydrogen nuclei relative to all other nuclei must be selected as the material for layer 12.

In order for a neutron to be detected, the scintillation light produced when the recoil proton deposits part of its energy in the scintillating layer 14 must travel from the point where the scintillation light was created (in the scintillating layer 14) to a light collection device, such as a photomultiplier tube (PMT) 17, placed along one or more of the surfaces of the detector 10, as illustrated in FIG. 1. Thus, typically all layers 12, 14, 16, 16' of the detector 10 should be optically transparent to the scintillation light produced so that the light reaches the PMT 17. Additionally, to minimize the loss of light at the interfaces between the layers, the indices of refraction of the materials in layers 12, 14, 16 and 16' should be approximately the same. Optically transparent plastics such as polystyrene and polyethylene, and glass have indices of refraction of approximately 1.5. Typically plastics are suitable materials for the hydrogenous non-scintillating converter material layer 12, and glass materials are suitable for the non-hydrogenous scintillating material layer 14 and barrier material layer 16. While the range of protons in polystyrene and polyethylene is approximately the same, the higher ratio of hydrogen to carbon atoms in polyethylene can improve the overall efficiency of the detector, as compared to polystyrene.

It is not necessary to know the location of the neutron interaction in the detector, or even which layer the neutron interacted since the probability that light will be generated depends on the direction of the incident radiation. This fact, along with the use of such optically transparent materials with similar indices of refraction, typically reduces or eliminates the need for the type of signal processing and data analysis typically required to reconstruct the path of the recoil proton in other directional neutron detectors. However, some signal processing may be required to discriminate against Compton electrons produced from gamma ray interactions. Compton scattering is likely to be the dominant gamma-ray interaction in the detector. Compton scattering produces an electron having energy in the hundreds of kiloelectron-volts (keV) that will deposit energy in the various layers it passes through. The typical range of these Compton scattered electrons is much greater than the thicknesses of the layers 12, 14, 16 and 16', thus the Compton electron will deposit its energy in many layers, including multiple scintillating layers.

To discriminate light scintillations produced by recoil protons that deposit their energy in a single scintillating layer from Compton electrons that deposit energy in more than one scintillating layer, two different types of non-hydrogenous scintillating material layers can be used, each different type of scintillating material having different scintillation properties. The shape of the pulses produced by the PMT will depend on the scintillating material. By analyzing the shape it is possible to determine if the light was produced by the first scintillating material, the second scintillating material, or some combination of the two materials. For the purpose of discrimination between neutrons and gamma rays in this invention, it typically not possible or necessary to know in which scintillating layer the photons were produced, but only to know in which type of scintillating materials the photons were produced. Light scintillations produced by a single scintillating material of either type would be indicative of a recoil proton, while light scintillations produced by combination of the two materials would be indicative of a Compton electron.

The detector of the invention has intrinsic directionality because some or all of the recoil protons produced by neutrons from a given direction are completely stopped in the layers of barrier material 16 or 16', making the probability that a recoil proton will deposit some of its energy in the scintillating material layer 14 a function of the direction of the incident neutrons. The most energetic recoil protons result from head-on collisions with the most energetic neutrons, because typically in a head-on collision the neutron will transfer nearly all of its energy to the proton. The recoil proton generated by a head-on collision with an incoming neutron will typically travel in a nearly straight line away from the incident neutron it collided with, losing energy primarily to nearby electrons.

Fast neutrons, emitted by nuclei undergoing fission or produced when alpha particles interact with heavy nuclei, typically have energies of at least one MeV. Neutrons with energy of 14 MeV are produced when deuterium (hydrogen-2) and tritium (hydrogen-3) undergo nuclear fusion, while neutrons with energy of 2.5 MeV are produced when deuterium (hydrogen-2) and deuterium undergo nuclear fusion. The energy of the resulting recoil proton will vary from nearly zero, when the proton scattering angle is 90°, to the energy of the incident neutron, when the proton scattering angle is 0°. For recoil protons with energies of one to several MeV, the range of the recoil proton through solids like glass and plastics is typically on the order of tens of micrometers (μm). Because the range of the recoil proton depends on the energy of the recoil proton, and the energy of the recoil proton depends on the energy of the incident neutron and the scattering angle, the range of the recoil proton will typically depend on the incoming direction and energy of the incident neutron and the scattering angle. The detector of the invention discriminates against neutrons from some directions by stopping, in one of barrier layers 16 or 16', the recoil protons produced by the interactions of these neutrons with hydrogen nuclei in the hydrogenous converter layer 12 before the recoil protons reach the scintillating layer 14.

If, for example, the thickness of the barrier layer (16 or 16') is greater than the range of the highest energy recoil proton, then all recoil protons produced in the hydrogenous converter layer 12 will be stopped in the barrier layer before reaching the scintillating layer 14. If instead, the thickness of the barrier layer is less than the range of the highest energy recoil proton, then some recoil protons produced in the hydrogenous converter layer 12 near the surface of the barrier layer 16 will not be stopped therein, but will instead pass through the barrier layer 16, enter the scintillating layer 14, and stop therein, resulting in the production of a scintillation light from the fraction of energy lost in the scintillating layer 14.

The required thickness of the layers 12, 14, 16, and 16' typically depends on the choice of materials for the different layers and the energy of the incident neutrons, which determines the energy and range of the recoil protons in those materials. Plastics or polymers have been used extensively in fast neutron detectors based on the detection of recoil protons. Plastic scintillator detectors typically consist of an organic scintillator dissolved in an appropriate solvent, such as polyvinyl toluene or polymethylmethacrylate, which can then be polymerized. In addition to the relatively high concentration of hydrogen atoms, plastics can be made into thin films, making them good candidates for the hydrogenous non-scintillating converter layer 12. The thickness of the converter layer 12 should typically be less than the range of the highest energy recoil proton. While there is no simple theoretical relationship between the range of a proton (or other heavy charged particle) and its energy, the required thickness can be estimated from tables and/or graphs of experimental data or calculations, or from empirical relationships. Ranges given here were calculated using the SRIM-2006 software package, available for free download at www.srim.org, which provides tables of stopping powers, range and straggling distributions for any ion at any energy in any elemental target. Assuming a plastic is used for the hydrogenous converter layer 12, then for neutrons having energy of about 1 MeV the combined thicknesses of the hydrogenous layer 12 and any thin barrier layer 16' should be approximately 20 micrometers (μm). Making this layer thicker results in recoil protons that can not reach the scintillating layer 14, regardless of the direction of the incident neutron and decreases the overall efficiency of the detector.

The presence of hydrogen in the plastic and/or organic converter layer materials 12 make these materials unsuitable for the use in the non-hydrogenous scintillating material 14. While there are a number of inorganic scintillators available, glass scintillators have indices of refraction approximately equal to that of plastic, and like plastics, glass can also be made into thin layers. Glass scintillators are typically made from either quartz or silicate glasses activated with cerium. Lithium is also sometimes added for purposes of neutron detection, but is undesirable in this instance because the use of lithium typically leads to scintillation light and output pulses from events other than the production of recoil protons. A non-scintillating glass can also be used for the non-hydrogenous barrier material layers 16. If some form of glass is used for the two non-hydrogenous layers 14, 16, then the range of 1 MeV protons would be approximately 15 μm. The combined thickness of the scintillating layer 14 and any thin barrier layer 16 should be approximately 15 μm.

At higher neutron energies, the required thickness of these layers (12, 14, 16) increases significantly because the range of protons with energies equal to the incident neutron increases. At 10 MeV, for example, the combined thickness of the plastic hydrogenous converter layer 12 and the thin barrier layer 16 would be approximately 1 millimeter (mm), and the combined thickness of the scintillating layer 14 and any thin barrier layer 16 should be approximately 700 μm.

The overall geometric dimensions and shape of the detector typically depends on the particular application for which the detector is being used. Smaller detectors can, for example, be incorporated into handheld instruments but are less efficient than larger detectors that might be portable but not compact enough for handheld instruments. While the detector of the invention can take various forms, the possibilities for variations of the detector's dimensions and shape may be limited by the requirements of light collection of the scintillation events. As the size of the detector is increased by either increasing the number of layers or by increasing the area of the individual layers, the number of scintillation photons lost through absorption and internal reflection between the layers will increase. It is expected that for most applications the overall dimensions of the part of the detector made of the alternating material layers will be several centimeters, with hundreds or possibly thousands of individual layers.

Figure 2A:
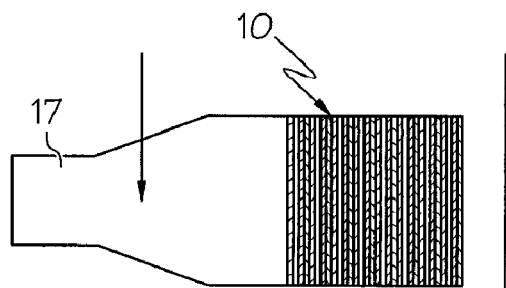
FIGS. 2A-D are illustrations of various embodiments of the detector of the invention, showing how the detector can be coupled to one or more photomultiplier tubes.
Figure 2B:
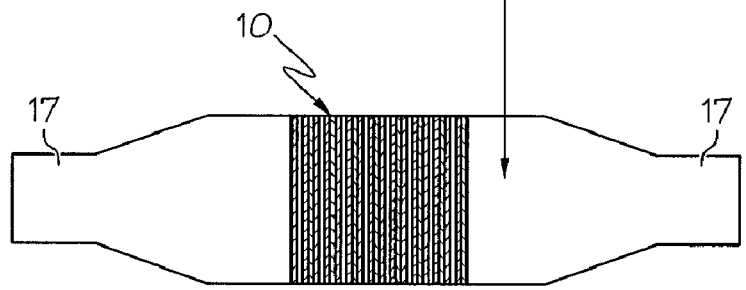
Figure 2C:
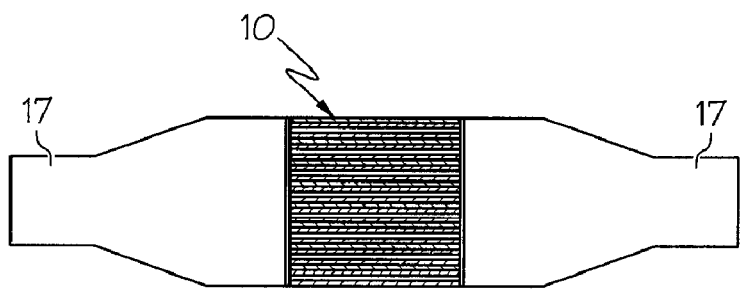
Figure 2D:
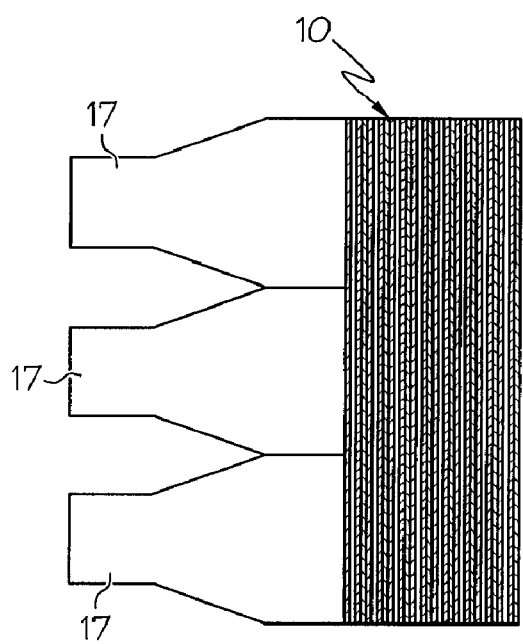

In order to efficiently collect the light without the need for light pipes (transparent solids that couple the scintillator layers to the PMT using total internal reflection to transport the photons from the scintillator to the PMT), the surface of the detector should be flat. Photomultiplier tubes (PMTs) are typically available with circular, square, or hexagonal faces, making right cylinders and right parallelepipeds two of the shapes most easily coupled, as illustrated in FIGS. 2A-D. The detector material can be viewed by the PMTs from either a single side, as shown in FIGS. 2A and 2D, or from opposite sides, as shown in FIGS. 2B and 2C. In FIG. 2A, a right cylinder-shaped detector 10 is viewed from the left end by a single PMT 17. FIG. 2B illustrates a right cylinder-shaped detector 10 viewed from right and left ends by two PMTs 17. FIG. 2C illustrates a right parallelepiped detector 10 viewed from the right and left ends by two PMTs 17. For larger detectors, an array of PMTs may used to cover the face detector material, as illustrated in FIG. 2D, which shows an elongated right cylinder viewed by an array of PMTs 17 on its left end. In addition to the various embodiments shown in FIGS. 2A-D, the detector of the invention can be viewed from all sides in a three-dimensional arrangement. For example, a right parallelepiped-shaped detector could be viewed from all six sides (not shown). The layered materials 12, 14, 16 and 16' typically have similar indices of refraction and are transparent to the scintillation light produced. The order and thickness of the layers 12, 14, 16, and 16' are typically chosen to create an optimal intrinsic efficiency for the detector, so that the scintillation light output of the detector will be primarily dependent upon the angle of the incident neutron radiation (i.e. the geometric efficiency).

Within a single detector, the thicknesses of each of the various types of layers would depend on the range of the fast neutron being detected. As a non-limiting example, FIG. 3 is a schematic of the material layering within the detector for neutrons with an energy of 1 MeV, showing the various layers.

Figure 3:
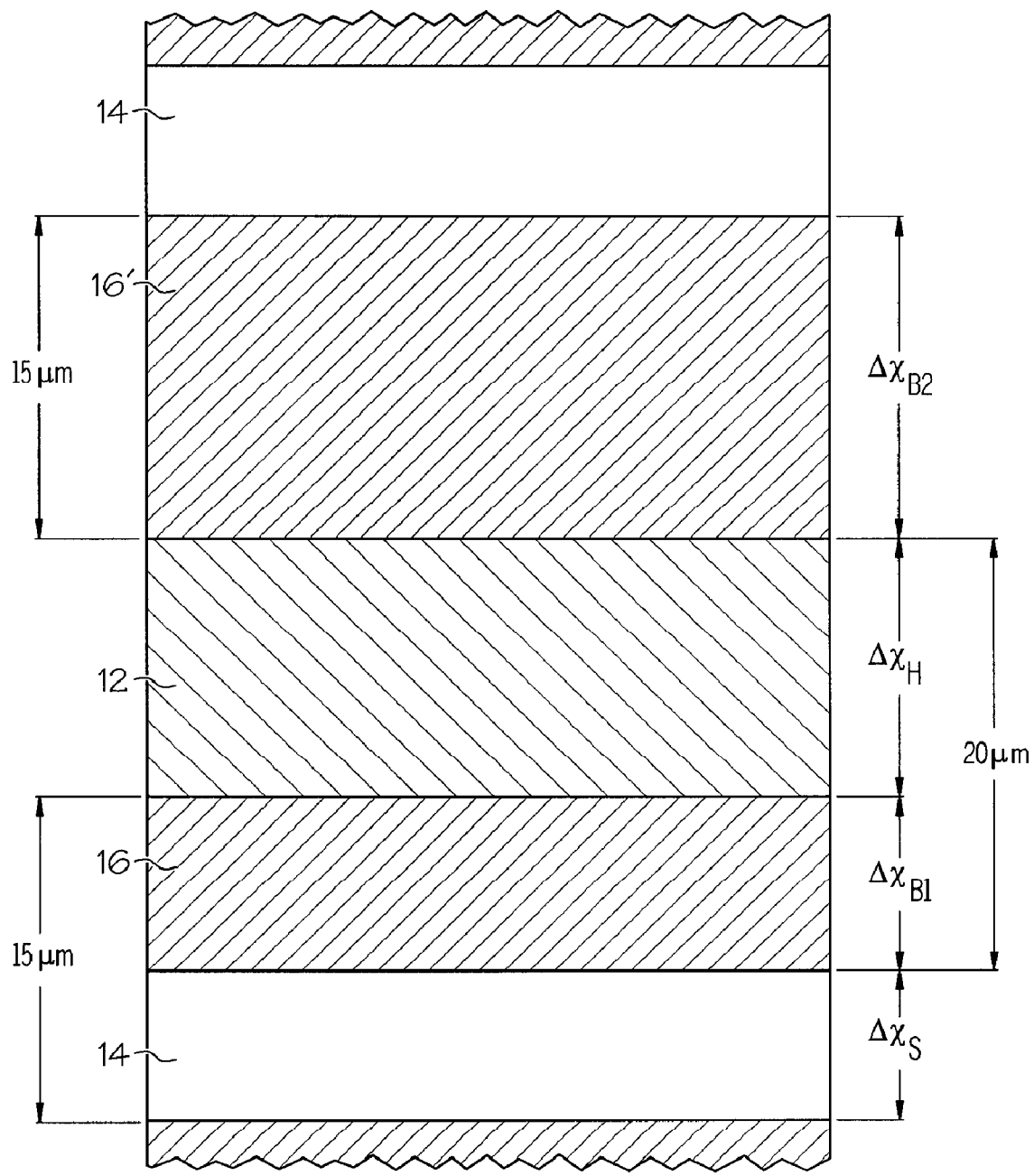
FIG. 3 is a schematic of the material layering within the detector for neutrons with an energy of 1 MeV, showing the relationship between the thicknesses of the various layers, including two distinct layer thicknesses of barrier material, identified as 16 and 16'.

FIG. 3 shows the relationship between the thicknesses of the various layers, including two distinct layer thicknesses of barrier material, identified as 16 and 16', for the case where the incident neutrons have an energy of 1 MeV. The thicker of these two barrier layers, 16', has a thickness of 15 μm, the approximate range of a 1 MeV proton in glass. Almost all recoil protons originating in the converter layer 12 will be stopped in a barrier layer 16' of this thickness before reaching the scintillating layer 14. As illustrated in FIG. 3, the thicknesses of the thinner barrier layer 16 and hydrogenous converter layer 12 are chosen so that the combined thicknesses of the two layers are 20 μm, the typical range of a 1 MeV proton in plastic. Finally, the thickness of the scintillating layer 14 is chosen so that the combined thicknesses of the scintillating layer 14 and the thinner barrier layer 16 is 15 μm.

Figure 4:
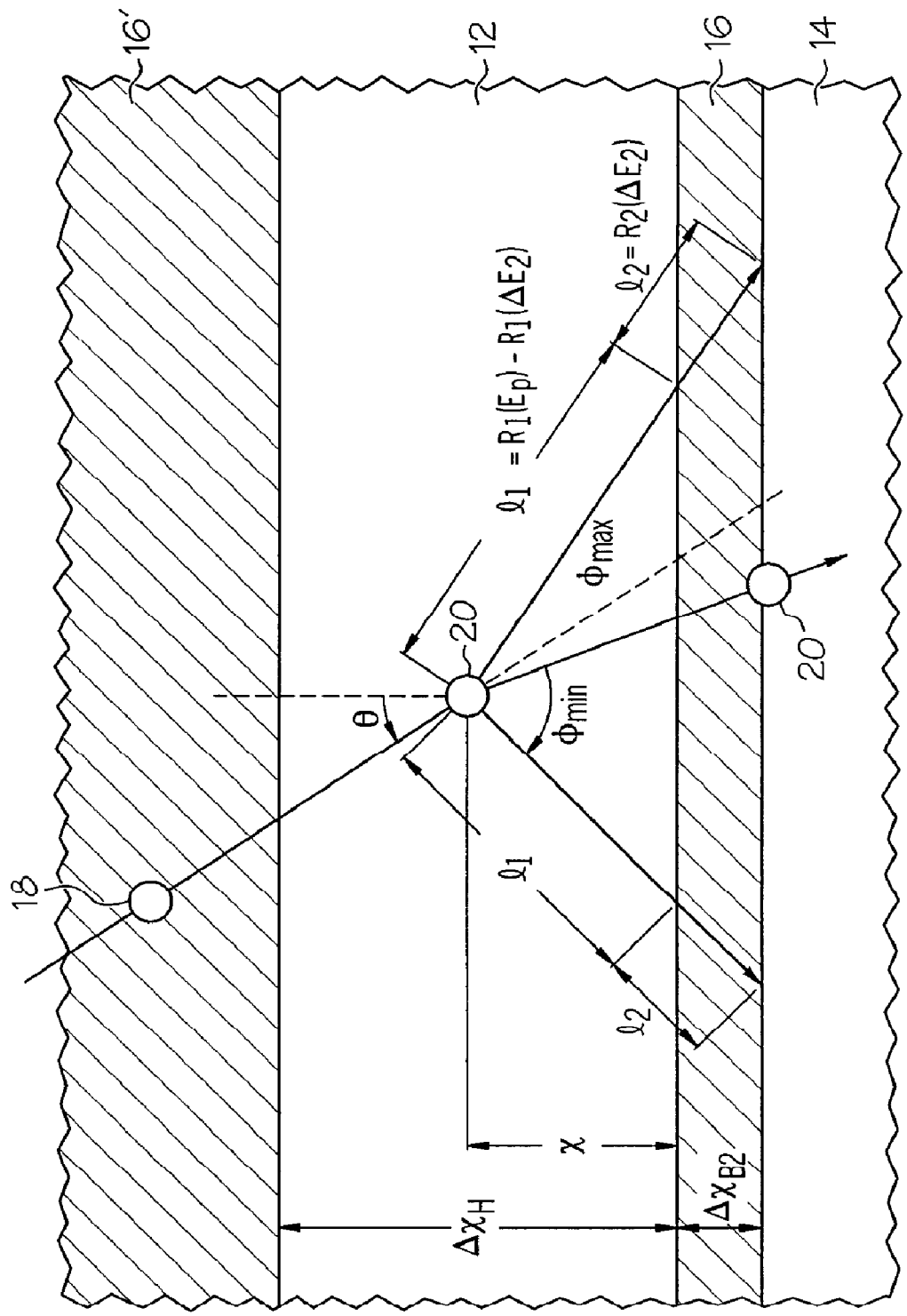
FIG. 4 is a schematic illustration of a neutron-proton collision within the layers of the neutron detector of FIG. 1.

FIG. 4 illustrates how a neutron 18 incident to the surface of the converter material layer 12 at an angle θ elastically scatters off a proton, generating a recoil proton 20. The recoil proton 20 is capable of reaching the scintillating material layer 14 if it is produced between angles $\Phi_{min}$ and $\Phi_{max}$. The energy of the recoil proton, $E_p$ is determined by the formula:

$$E_p E_n \cos^2 \phi$$

where $E_n$ is the energy of the incident neutron and $\phi$ is the scattering angle of the proton relative to the direction of the incident neutron. For neutrons-elastically scattering off protons, the scattering angle $\phi$ is limited to values between 0° and 90°. As the scattering angle $\phi$ increases from 0° towards 90° the cosine function decreases from one to zero, and consequently the energy of the recoil proton decreases from the energy of the incident neutron to zero. The range of the recoil proton therefore decreases from the range of a proton with energy $E_n$ to zero as the scattering angle increases from 0° and 90°. A recoil proton will only reach the scintillating layer 14 if its range exceeds the distance from the scattering location to the surface of the scintillating layer 14.

It is possible to calculate the range of scattering angles, i.e. $\phi_{min}$ and $\phi_{max}$, that result in a recoil proton with sufficient energy to reach the scintillating material 14, based upon the incident angle of the neutron, θ, and the distance, x, of the scattering location from the surface of the scintillating material layer 14.

$$\phi_{min} = -\cos^{-1}\left[\frac{x + \Delta x_{B2}}{l_1 + l_2}\right] - \theta$$

$$\phi_{max} = -\cos^{-1}\left[\frac{x + \Delta x_{B2}}{l_1 + l_2}\right] - \theta$$

where $\Delta x_{B2}$ is the thickness of any non-hydrogenous barrier material 16' and $$l_1 = R_1(E_p) - R_1(\Delta E_2)$$

$$l_2 = R_2(\Delta E_2).$$

$R_1(E)$ and $R_2(E)$ are the ranges of a proton with kinetic energy E in the hydrogenous non-scintillating converter material layer 12 and the non-hydrogenous non-scintillating barrier material layers 16 and 16', respectively. The quantity $\Delta E_2$ is the energy which is lost by the proton while slowing down in the thin barrier layer 16. The angles $\phi_{min}$ and $\phi_{max}$ can be used to calculate the probability that a scattered proton will reach the scintillating material layer 14 as a function of the incident angle of the neutron, θ, and the depth of the scattering interaction, x, for a given neutron energy. The random variable $\Phi$ is defined as the proton scattering angle and $P(\Phi=\phi)d\phi$ is its corresponding probability distribution. The probability of a proton scattering at an angle between $\phi$ and $\phi+d\phi$, is given by the following equation:

$$P(\Phi=\phi)d\phi=f(\phi)d\phi$$

where $f(\phi)$ is the probability density function and is given by:

$$f(\phi)d\phi = \begin{cases} 0 & \text{if } \phi < -90° \\ |\sin\phi\cos\phi| & \text{if } -90° \leq \phi \leq 90° \\ 0 & \text{if } \phi > 90° \end{cases}$$

The probability of a proton scattering at an angle less than $\phi$, $P(\Phi \leq \phi)$, is equal to the cumulative distribution function $F(\phi)$ $$P(\Phi \leq \phi) = F(\phi) = \int_{-\infty}^{\phi} f(\phi')d\phi'$$

Evaluating the cumulative distribution function gives:

$$F(\phi) = \begin{cases} 0 & \text{if } 0° < 90° \\ (1/2)\sin^2(\phi+90°) & \text{if } -90° \leq \phi < 0° \\ (1/2)(1+\sin^2\phi) & \text{if } 0° \leq \phi \leq 90° \\ 1 & \text{if } 0° > 90° \end{cases}$$

The probability that a neutron scattered at a depth x within the converter material layer 12 will result in a recoil proton with sufficient energy to stop outside the converter layer 12 can be estimated by the following equation:

$$\epsilon_{LLD=0}(E_n,\theta,x) = F[\phi_{max}(E_n,\theta,x)] - F[\phi_{min}(E_n,\theta,x)]$$

Figure 5:
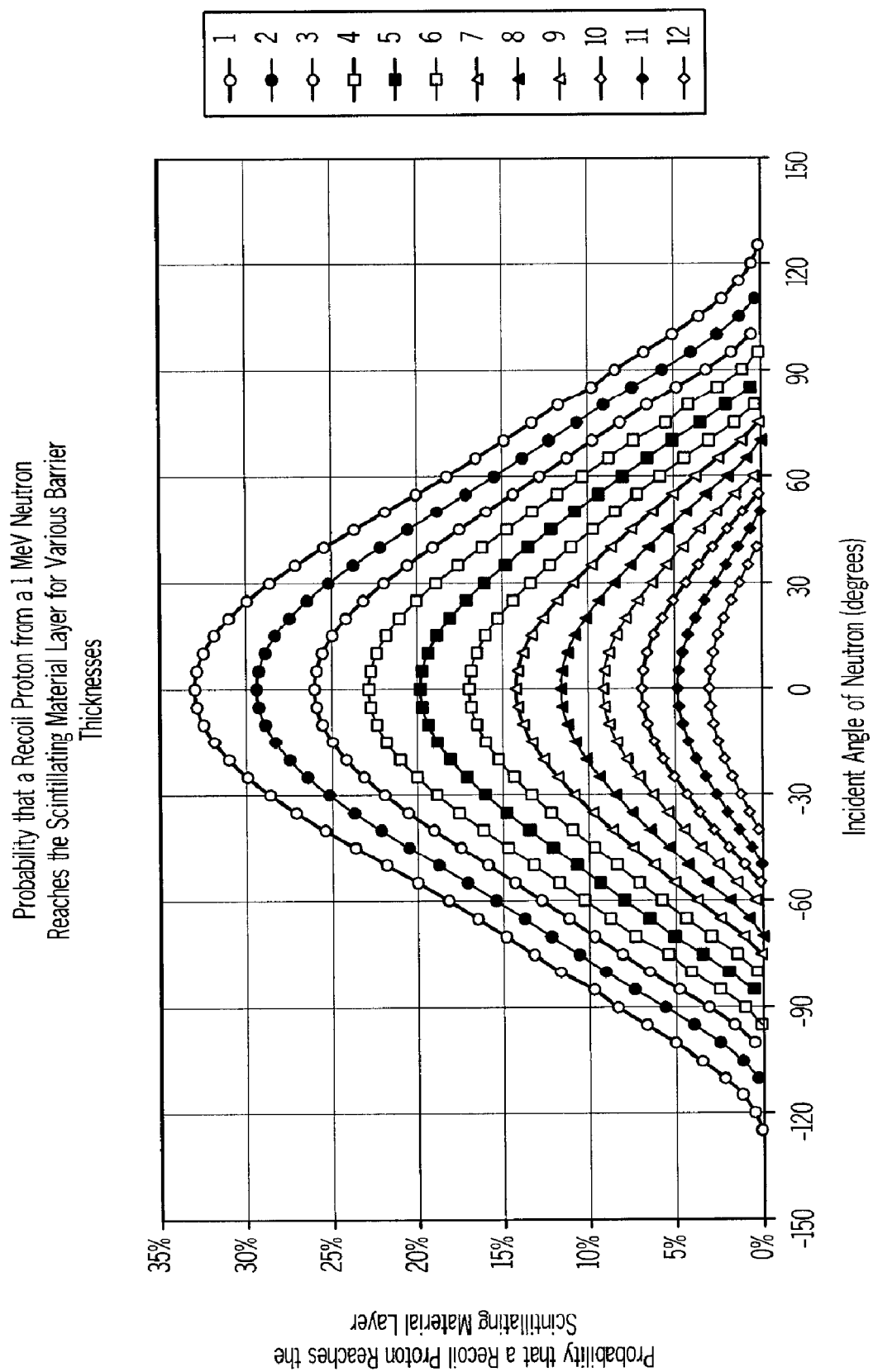
FIG. 5 illustrates the results of calculations to estimate the probability that a recoil proton generated by a 1 MeV neutron reaches the scintillating layer as a function of the angle of the incident neutron radiation for various thicknesses of barrier layers between the hydrogenous layer and the scintillating layer.

FIG. 5 illustrates the results of calculations to estimate, as a function of the incident neutron angle, the probability that a neutron having energy of 1 MeV which is incident upon a polystyrene hydrogenous converter layer 12 will result in a recoil proton of sufficient energy to travel beyond the converter layer 12. The results are shown for various barrier thicknesses between 1 and 12 μm. As the thickness of the barrier is increased, the probability that a recoil proton will reach the scintillating decreases for neutrons from all angles, but the decrease is greater for larger angles of incidence than for smaller angles of incidence. The method for this calculation is discussed in detail immediately above.

Figure 6A:
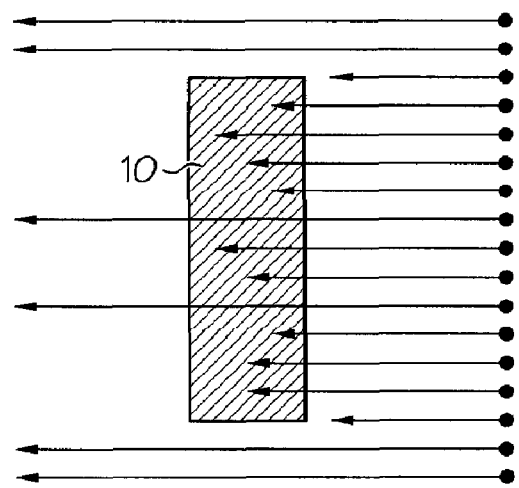
FIGS. 6A-C are schematic illustrations of the effect of the orientation of a detector of the invention within a neutron radiation field as it relates to the overall efficiency/directionality of the detector.
Figure 6B:
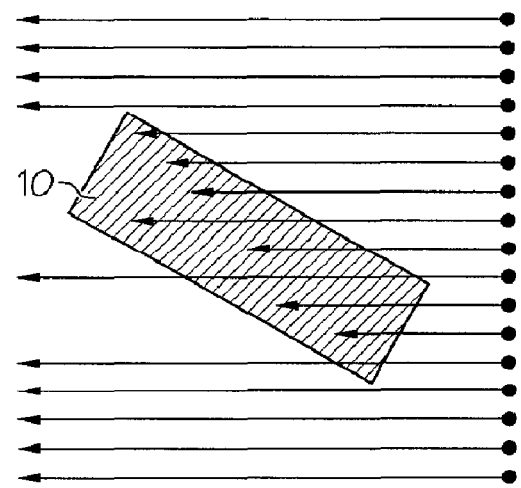
Figure 6C:
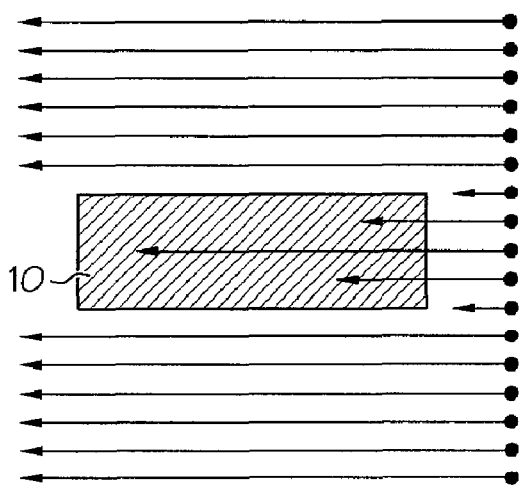

FIGS. 6A-C illustrate neutrons (as small black dots) traveling from the right to the left so that they are incident at an angle on a detector 10 that is significantly wider than it is thick. As shown, the number of neutrons that are incident on the detector 10 depends on the orientation of the detector 10 relative to the direction of the incident neutrons. When the detector is oriented as shown in FIG. 6A, more of the neutrons will be both incident on and likely to interact in the detector 10 since the detector's orientation is straight up and down relative to the incoming neutrons, whereas in FIGS. 6B-C the orientation of the angle of incoming neutrons relative to the detector 10 is altered, so that fewer neutrons will be incident on and likely to interact in the detector 10. This dependence on the orientation of the detector relative to the direction of the incoming neutron beam is referred to as the geometric directionality of the detector, $\epsilon_{geom}(\theta)$, in contrast to the intrinsic directionality, $\epsilon_{int}(\theta)$, which results from the structure and composition of the detector's interior relative to the direction of the neutron field.

For prior art homogeneous detectors, defined as detectors whose active volume is made from a single hydrogenous scintillating material, the intrinsic directionality is approximately constant and any directionality of the detector is primarily due to its shape, which determines its geometric directionality. The heterogeneous detector of the present invention typically exhibits both intrinsic and geometric directionality, producing a much greater directionality than prior art homogenous detectors.

The efficiency of a detector describes the likelihood that the detector will produce a measurable response when a radiation of interest interacts with the detector. The intrinsic and geometric components of the efficiency are respectively defined by the material and shape of the detector. The intrinsic and geometric directionalities of the detector of the invention are the intrinsic and geometric efficiencies as a function of the orientation of the detector relative to a monodirectional radiation field. Stated otherwise, the efficiency for the detector of the invention is strongly dependent upon the orientation of the detector within a radiation field having a directional component. This strong dependence of the efficiency upon the relative orientation between the detector and source (i.e. the strong directionality) is a result of the design of the system, in which both material properties and shape are used to contribute to a strong directionality. Just as the geometric efficiency and the intrinsic efficiency can be multiplied together to calculate the absolute efficiency, the geometric directionality and intrinsic directionality can be multiplied together to calculate the absolute directionality, as shown below $$\epsilon_{abs}(\theta) = \epsilon_{int}(\theta) \cdot \epsilon_{geom}(\theta)$$

The absolute directionality is the probability that a neutron incident from a given direction will result in a measurable scintillation of light from a recoil proton, given the orientation of the detector relative to the incoming neutron beam. For the fast neutron detector of the invention, the intrinsic directionality, $\epsilon_{int}(\theta)$, is defined as the probability that an incident neutron will be detected once it is inside the detector as a function of the angle between the axis of the cylinder and the direction of the incident neutron radiation (see FIGS. 6A-C). The intrinsic directionality, $\epsilon_{int}(\theta)$, of the detector of the invention typically depends on the materials selected and the thicknesses of the individual layers in the detector as a function of the orientation of the detector relative to the direction of the incoming neutron beam.

The geometric directionality, $\epsilon_{geom}(\theta)$, of the detector is the likelihood that a neutron from a given direction will find its way into the detector to produce a recoil proton, which depends on the overall shape and size of the detector as a function of the orientation of the detector relative to the direction of the incoming neutron beam. With the possible exception of spherical detectors (i.e. Bonner spheres), most detectors will exhibit some geometric directionality in their response because of their overall geometric shape or some heterogeneity in their composition. Bonner spheres are designed to determine the energy spectra of a neutron beam without concern for directionality.

Figure 7:
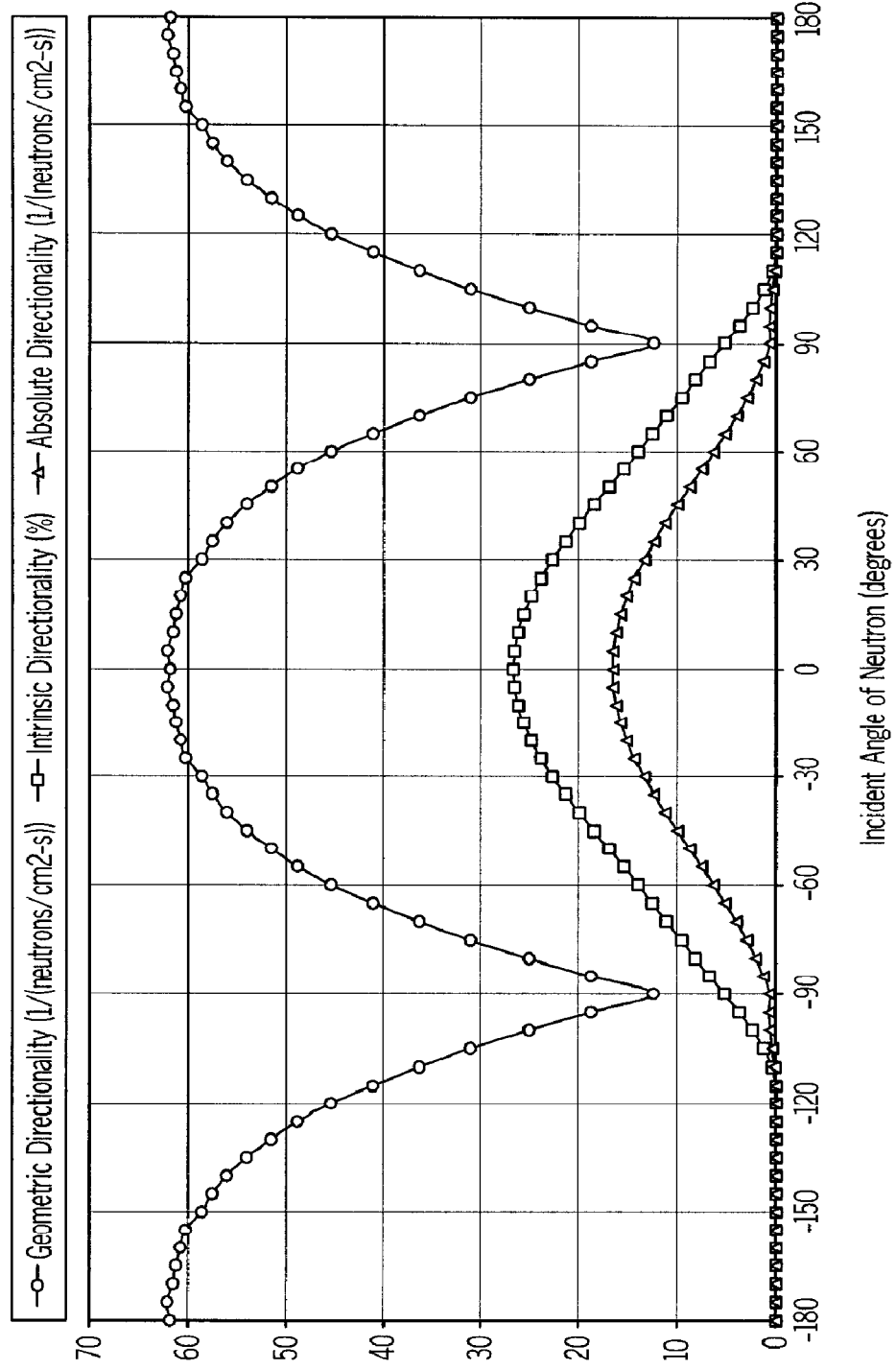
FIG. 7 illustrates the results of calculations to estimate the geometric, intrinsic, and absolute directionality of cylindrical detector 25 cm in diameter, 2.5 cm thick with a 20 µm polystyrene hydrogenous converter layer and a 2 µm quartz barrier layer for 1 MeV neutrons.

As shown in FIG. 7, the probability that a recoil proton generated by an incident neutron with energy of 1 MeV will reach the scintillating layer 14 depends on the thickness of the thin barrier layer 16 and the direction of the incident neutron. The thickness of the various layers would be chosen based on the neutron energy or energies of interest, and would depend on the application. The geometrical directionality results from the size and disc like shape of the cylindrical detector. The diameter of the detector is 10 times as large as the thickness, so that the area "seen" by neutrons incident on the front of the detector is much larger than the area "seen" by neutrons incident on the side of the detector. The intrinsic efficiency depends on the composition and thickness of the various layers. Recoil protons generated by neutrons incident on the front of the detectors have a relatively high probability of passing through the 2 µm barrier layer to deposit part of their energy in the scintillating layer. A 15 µm barrier layer on the other side of the hydrogenous layer prevents neutrons incident from the opposite direction from reaching the scintillating layer. The overall response of the detector, the absolute directionality, is determined by multiplying the geometric directionality and intrinsic directionality.

Directional fast neutrons have a number of potential applications, including locating sources of fast neutrons and monitoring sources of fast neutrons. For example, if a source of fast neutrons was known to be in a given area, or was detected by another type of radiation detector, the present invention could be used to determine the direction of the fast neutrons coming from the source, and ultimately the location of the source. To do this, the count rate of the detector would be observed as the detector was rotated. The highest count will be observed when the detector is pointed directly at the source. By determining the direction of the source from several different locations, the approximate location of the source can be determined. This application would be particularly useful in locating special nuclear material (SNM), such as plutonium or other heavy elements used in the manufacture of nuclear weapons, having constituent isotopes that emit fast neutrons through spontaneous fission or other modes of radioactive decay.

Another application for the detector of the invention can be monitoring of SNM at nuclear facilities under safeguards regimes. An array of directional neutron detectors of the invention would be very effective in verifying that the SNM had not been removed from the facility or moved from its existing location. Because of the directional sensitivity of the detectors, such an array can be positioned in a manner that produces a very low background signal and thus a high signal to noise ratio in the system. The array will therefore have high sensitivity not only to movements of the source but also to changes in the activity of the source being monitored. This combination would render very difficult any surreptitious diversion of the SNM. For example, traditional, non-directional monitors require a significant change in the count rate to indicate that the SNM being monitored had been moved. In order to remove the SNM without causing a change in the count rate, the SNM could be replaced by one or more sources of fast neutrons. For traditional neutron detectors, the locations of the sources need not be the same as that of the SNM so long as the instrument response was the same. For example, a neutron source that emits more neutrons than the SNM could be placed further away from the detector. In contrast, the use of directional detectors would require that the sources be placed in the same approximate location as the SNM be removed. Also, the high signal to noise ratio of the directional array would require a much more exact match of the characteristics between the false source and the original SNM.

In addition to confirming that SNM and other sources of fast neutrons have not been removed from a facility, a system of directional fast neutron detectors could be used to detect sources of fast neutrons, including SNM, in containers and packages being scanned. Like the previous application, an array of directional fast neutron detectors of the present invention would be pointed towards the container or array of containers being scanned. By detecting only neutrons originating inside the container, improved sensitivity can be realized and smaller quantities of SNM or other sources of neutrons can be reliably detected. This system would also be of particular interest in settings such as ports of entry, where a neutron source could be detected and localized within a large group of shipping containers by an array of directional detectors. Similarly, in airports a large number of bags could be reliably monitored for SNM in real time using an array of directional detectors of the invention. The high signal to noise ratio of a directional detector array will enhance the probability of detecting small quantities of SNM when compared to traditional, non-directional detectors, and the directional characteristics of the detectors can be used to detect motion of a source and enhance discovery of the source by providing location information.

The fast neutron detection system of the present invention is an improvement over the many neutron detectors known in the prior art because it is small in size, simple in construction, and more rugged than many currently existing neutron detection systems. Further, the efficiency and the sensitivity of neutron detection can be easily changed by changing the thickness of the various layers within the detector.

While the present invention has been illustrated by the description of embodiments and examples thereof, it is not intended to restrict or in any way limit the scope of the appended claims to such detail. Additional advantages and modifications will be readily apparent to those skilled in the art. Accordingly, departures may be made from such details without departing from the scope or spirit of the invention.

What is claimed is:

1. A directional fast neutron detector, comprising:
   a) a plurality of layers of material arranged in an order, each of the plurality of layers having a predetermined thickness and a composition selected from the group consisting of:
      i) a hydrogenous non-scintillating converter material operable to produce a recoil proton when a fast neutron is incident therein;
      ii) a non-hydrogenous scintillating material operable to generate a scintillation light when the recoil proton loses energy therein; and
      iii) a non-hydrogenous non-scintillating barrier material operable to act as a barrier to passage of the recoil proton therethrough; and
   b) at least one light collection device located along the periphery of the layers for producing a signal when the scintillation light generated by the non-hydrogenous scintillating material is incident thereon,
   wherein the composition, order, and thickness of each of the plurality of layers allows the general direction of incoming incident fast neutrons to be established.

2. The detector of claim 1, wherein the light collection device is a photomultiplier tube.

3. The detector of claim 1, wherein the light collection device is a photodiode.

4. The detector of claim 1, wherein the order of the plurality of layers is repeated at regular intervals.

5. The detector of claim 1, wherein the order of the layers comprises:
   a) a first layer of the non-hydrogenous non-scintillating barrier material;
   b) a layer of the hydrogenous non-scintillating converter material;
   c) a second layer of the non-hydrogenous non-scintillating barrier material; and
   d) a layer of the non-hydrogenous scintillating material.

6. The detector of claim 5, wherein the thickness of the first layer of the non-hydrogenous non-scintillating barrier material is different than the thickness of the second layer of the non-hydrogenous non-scintillating barrier material.

7. The detector of claim 1, wherein each of the plurality of layers are optically transparent to the scintillation light produced so that the scintillation light reaches the at least one light collection device.

8. The detector of claim 1, wherein the indices of refraction of each of the plurality of layers are approximately identical to minimize the loss of light at the interfaces between the layers.

9. The detector of claim 1, wherein the hydrogenous non-scintillating converter material is an optically transparent plastic having an index of refraction of approximately 1.5, and wherein the non-hydrogenous scintillating material and the non-hydrogenous non-scintillating barrier material are made of an optically transparent glass material having an index of refraction of approximately 1.5.

10. The detector of claim 9, wherein the optically transparent glass material is one of quartz or a silicate glass activated with cerium.

11. The detector of claim 1, wherein the non-hydrogenous scintillating material layer is comprised of two different types of material having different scintillation properties, wherein the different scintillating materials are used for the purpose of discrimination between neutrons and gamma rays.

12. A directional fast neutron detector, comprising:
   a) a plurality of layers of a hydrogenous non-scintillating converter material operable to produce a recoil proton when a fast neutron is incident therein;
   b) a plurality of layers of a non-hydrogenous scintillating material operable to generate scintillation light when the recoil proton loses energy therein; and
   c) a plurality of layers of a non-hydrogenous non-scintillating barrier material operable to act as a barrier to passage of the recoil proton therethrough,
      wherein the plurality of layers of materials are arranged in an order, each of the plurality of layers having a predetermined thickness, and wherein the composition, order, and thickness of each of the plurality of layers allows the general direction of incoming incident fast neutrons to be established.

13. The detector of claim 12, further comprising at least one light collection device for producing a signal when the scintillation light generated by the non-hydrogenous scintillating material is incident thereon.

14. The detector of claim 12, wherein the order of the plurality of layers is repeated at regular intervals, and wherein the order of the layers comprises:
   a) a layer of the non-hydrogenous non-scintillating barrier material;
   b) a layer of the hydrogenous non-scintillating converter material; and
   c) a layer of the non-hydrogenous scintillating material.

15. The detector of claim 14, wherein the order of the plurality of layers further comprises a second layer of the non-hydrogenous non-scintillating barrier material, the second layer located between the converter material layer and the non-hydrogenous scintillating material layer.

16. The detector of claim 15, wherein the thickness of the first layer of the non-hydrogenous non-scintillating barrier material is different than the thickness of the second layer of the non-hydrogenous non-scintillating barrier material.

17. The detector of claim 12, wherein the non-hydrogenous scintillating material layer is comprised of two different types of material having different scintillation properties, wherein the different scintillating materials are used for the purpose of discrimination between neutrons and gamma rays.

18. The detector of claim 12, wherein the hydrogenous non-scintillating converter material is made of an optically transparent plastic material having an index of refraction of approximately 1.5, and wherein the non-hydrogenous scintillating material and the non-hydrogenous non-scintillating barrier material are made of an optically transparent glass material having an index of refraction of approximately 1.5.

19. A method for detecting fast neutrons, comprising:
   a) providing a fast neutron detector, wherein the detector comprises a plurality of layers of material arranged in an order, each of the plurality of layers having a predetermined thickness and a composition selected from the group consisting of:
      i) a hydrogenous non-scintillating converter material operable to produce a recoil proton when a fast neutron is incident therein;
      ii) a non-hydrogenous scintillating material operable to generate a scintillation light when the recoil proton loses energy therein; and
      iii) a non-hydrogenous non-scintillating barrier material operable to act as a barrier to passage of the recoil proton therethrough;
   b) providing at least one light collection device for producing a signal when the scintillation light generated by the non-hydrogenous scintillating material is incident thereon; and
   c) determining the general direction of the incoming incident fast neutrons according to the composition, order, and thickness of each of the plurality of layers.

20. The method of claim 19, wherein the order of the layers comprises:
   a) a first layer of the non-hydrogenous non-scintillating barrier material;
   b) a layer of the hydrogenous non-scintillating converter material;
   c) a second layer of the non-hydrogenous non-scintillating barrier material; and
   d) a layer of the non-hydrogenous scintillating material, wherein the thickness of the first layer of the non-hydrogenous non-scintillating barrier material is different than the thickness of the second layer of the non-hydrogenous non-scintillating barrier material.

* * * * *